United States Patent [19]
Goto et al.

[11] Patent Number: 5,406,493
[45] Date of Patent: Apr. 11, 1995

[54] VEHICLE-CARRIED NAVIGATION SYSTEM

[75] Inventors: Hirofumi Goto; Kazuhiro Yokouchi, both of Hyogo, Japan

[73] Assignee: Mitsubishi Denki Kabushiki Kaisha, Tokyo, Japan

[21] Appl. No.: 169,531

[22] Filed: Nov. 30, 1993

Related U.S. Application Data

[63] Continuation of Ser. No. 746,366, Aug. 16, 1991, abandoned.

[30] Foreign Application Priority Data

Dec. 19, 1990 [JP] Japan ................ 2-403773

[51] Int. Cl.⁶ .......................................... G06F 15/50
[52] U.S. Cl. ................................ 364/449; 364/443; 364/521; 340/995
[58] Field of Search ............... 364/449, 457, 443, 521; 340/995

[56] References Cited

U.S. PATENT DOCUMENTS

| | | | |
|---|---|---|---|
| 4,796,191 | 1/1989 | Honey et al. | 364/450 |
| 4,827,420 | 5/1989 | Musa | 364/449 |
| 4,874,658 | 11/1989 | Takashima et al. | 364/449 |
| 4,890,233 | 12/1989 | Ando et al. | 364/457 |
| 4,891,760 | 1/1990 | Kashiwazaki et al. | 364/443 |
| 4,903,211 | 2/1990 | Ando | 364/443 |
| 4,920,504 | 4/1990 | Sawada et al. | 364/521 |
| 4,939,661 | 7/1990 | Barker et al. | 364/443 |
| 4,989,151 | 1/1991 | Nuimura | 364/449 |
| 5,117,363 | 5/1992 | Akiyama et al. | 364/449 |
| 5,130,704 | 7/1992 | Toyama et al. | 340/995 |
| 5,136,458 | 8/1992 | Durivage, III | 361/93 |
| 5,161,886 | 11/1992 | De Jung et al. | 364/449 |

FOREIGN PATENT DOCUMENTS 3805810 9/1989 Germany.

*Primary Examiner*—Thomas G. Black
*Assistant Examiner*—Julie D. Day

[57] ABSTRACT

A vehicle-carried navigation system wherein a current position is judged rapidly even when setting or extensive correction of a current position is executed and displaying of a map is updated rapidly in a current position displaying mode even when a vehicle moves at a high speed and a map around a current position is displayed rapidly even when the display mode is changed over from a map displaying mode to a current position displaying mode. When one of a current position detecting apparatus and a picture drawing apparatus tries to read out map data from a map data storage apparatus, a judging device judges whether or not such map data have been read into and are held in the other apparatus, and if such map data are already held in the other apparatus, then the map data are not read out from the map data storage apparatus but are transferred from the other apparatus to the one apparatus by map data transfer device.

2 Claims, 5 Drawing Sheets

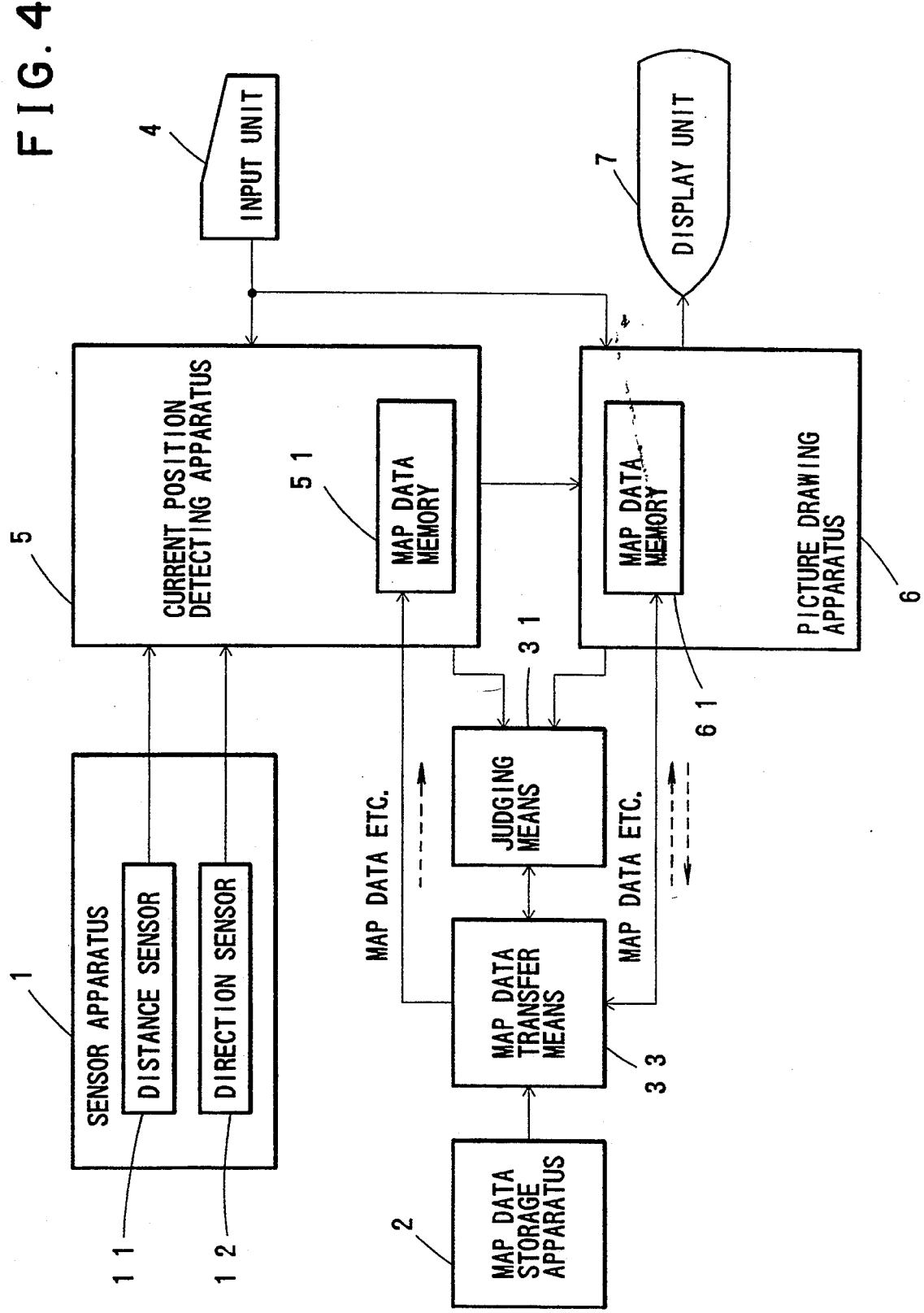

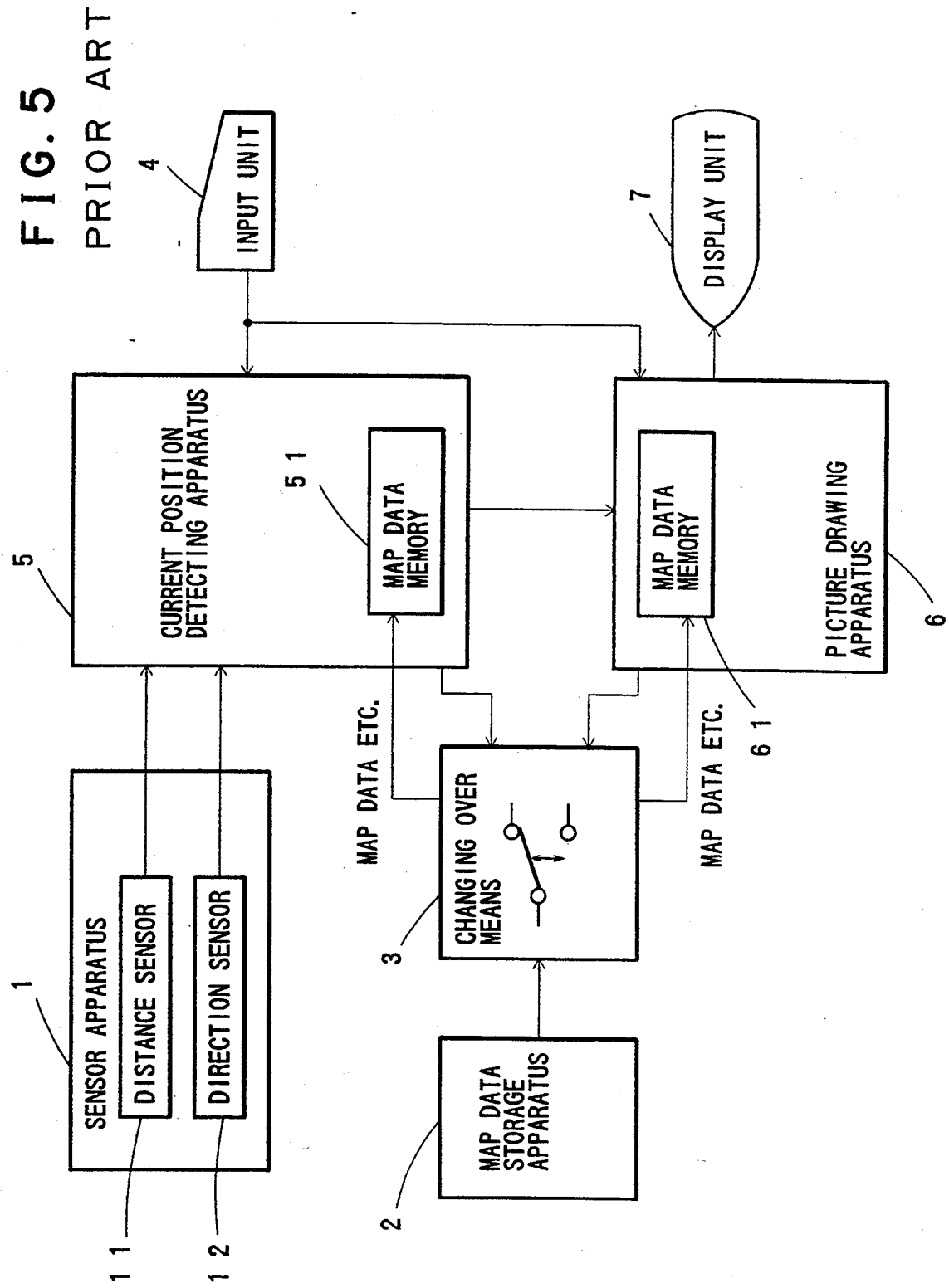

VEHICLE-CARRIED NAVIGATION SYSTEM

This application is a continuation of application Ser. No. 07/746,366 filed on Aug. 16, 1991, now abandoned.

BACKGROUND OF THE INVENTION

1. Field of the Invention

This invention relates to a vehicle-carried navigation system for displaying thereon a condition of movement of an automobile such as a current position, a locus of travel, and an advancing direction.

2. Description of the Prior Art

A vehicle-carried navigation system of the type mentioned is already known and disclosed, for example, in Japanese Patent Laid-Open Application No. 61-56910. FIG. 5 shows an exemplary one of such conventional vehicle-carried navigation systems.

Referring to FIG. 5, the conventional vehicle-carried navigation system shown includes a sensor apparatus 1 which in turn includes a distance sensor 11 for developing a pulse signal each time an automobile in which the vehicle-carried navigation system is incorporated runs for each predetermined distance, and a direction sensor 12 for developing a direction signal representative of an advancing direction of the vehicle.

The vehicle-carried navigation system further includes a map data storage apparatus 2 in which information for the detection of a current position of the vehicle and information for the drawing of a map are stored. The map data storage apparatus 2 may be a CD-ROM (compact disk read-only memory) in which map information is stored and a CD-ROM reproducing apparatus for reproducing such CD-ROM.

Changing over means 3 changes over the destination of map data read out from the map data storage apparatus 2 between a current position detecting apparatus 5 and a picture drawing apparatus 6 in accordance with a predetermined order of priority in response to a request or requests from one or both of the current position detecting apparatus 5 and the picture drawing apparatus 6. Each of the current position detecting apparatus 5 and the picture drawing apparatus 6 has a built-in map data memory 51 or 61 therein.

An input unit 4 has a plurality of switches not shown and scroll keys not shown for inputting therethrough data for the setting and connection of a current position, selection of a scale of a map to be displayed, selection of a region of a map to be displayed and so forth.

The current position detecting apparatus 5 detects a current position of the vehicle in accordance with a distance pulse signal and a direction signal received from the sensor apparatus 1 add map data read out from the map data storage apparatus 2 by way of the changing over means 3. The current position detecting apparatus 5 further executes setting and correction of a current position of the vehicle in accordance with a switch signal from the input unit 4.

The built-in map data memory 51 of the current position detecting apparatus 5 is provided to store therein map data read out from the map data storage apparatus 2.

The picture drawing apparatus 6 draws a map in accordance with map data read out from the map data storage apparatus 2 by way of the changing over means 3 and executes processing for the displaying of a current position on the thus drawn map in accordance with current position information received from the current position detecting means 5.

The built-in map data memory 61 of the picture drawing apparatus 6 is provided to store therein map data read out from the map data storage apparatus 2.

A display unit 7 displays a picture or a map and a current position of the vehicle thereon in response to a display signal from the picture drawing apparatus 6. The display unit 7 may be a CRT (cathode ray tube) display unit.

In operation, the current position detecting apparatus 5 executes dead-reckoning navigation in accordance with a distance pulse signal received, as the vehicle advances, from the distance sensor 11 and a direction signal received from the direction sensor 12 and representative of an advancing direction of the vehicle to calculate a new current position of the vehicle.

Meanwhile, the current position detecting apparatus 5 reads out map data from the map data storage apparatus 2 by way of the changing over means 3 and stores the map data into the map data memory 51 thereof, and then executes, in accordance with road data in the map data, map matching for the current position calculated by the dead-reckoning navigation described above to discriminate a more precise current position of the vehicle. A result of such judgment is outputted to the picture drawing apparatus 6.

Thus, the picture drawing apparatus 6 reads out, in accordance with the current position information received from the current position detecting apparatus 5, map data of a map around the current position from the map data storage apparatus 2 and stores the map data into the map data memory 61 thereof, and then executes drawing of a map in accordance with such map data.

The picture drawing apparatus 6 produces a display signal to control the display unit 7 to display thereon the map drawn by the picture drawing apparatus 6 and the current position on the thus displayed map.

Consequently, the current position of the vehicle is displayed on the display apparatus 6 together with the map around the current position.

Meanwhile, the current position 5 further executes correction of the current position and initial setting in accordance with a switch signal from the input unit 4. Similarly, the picture drawing apparatus 6 executes, in response to a switch signal from the input unit 4, drawing of a map of a different display scale or changing over of a display mode between a current position displaying mode in which a current position is displayed and another map displaying mode in which a map of an arbitrary region is displayed.

It is to be noted that, also when a map of an arbitrary region is to be displayed in the map displaying mode, the current position detecting apparatus 5 must necessarily read out map data from the map data storage apparatus 2.

In case requests for reading out of map data are received simultaneously from both of the current position detecting apparatus 5 and the picture drawing apparatus 6, a priority is provided to the current position detecting apparatus 5 by the changing over means 3 so that the current position detecting apparatus 5 reads out map data from the map data storage apparatus 2.

With the conventional vehicle-carried navigation system having such construction as described above, since the map data storage apparatus 2 is normally constituted from a CD-ROM and, a CD-ROM reproducing apparatus, a comparatively long time is required for reading out of map data, and when setting or expensive correction of a current position is performed, it is necessary for the current position detecting apparatus 5 to execute reading out of new map data, which delays judgment of a current position.

Further, when the vehicle is moving at a high speed or in some other case while the display mode is the current position displaying mode, map data must necessarily be read out frequently from both of the current position detecting apparatus 5 and the picture drawing apparatus 6, and further since a priority is provided to reading out from the current position detecting apparatus 5, updating of displaying of a map by the picture drawing apparatus 6 is delayed.

Also when the display mode is changed over from the map displaying mode to the current position displaying mode, displaying of a map around the current position is delayed.

SUMMARY OF THE INVENTION

It is an object of the present invention to provide a vehicle-carried navigation system wherein a current position is determined rapidly even when setting or extensive correction of a current position is executed.

It is another object of the present invention to provide a vehicle-carried navigation system wherein displaying of a map is updated rapidly in a current position displaying mode even when a vehicle moves at a high speed.

It is a further object of the present invention to provide a vehicle-carried navigation system wherein a map around a current position is displayed rapidly even when the display mode is changed over from a map displaying mode to a current position displaying mode.

In order to attain the above objects, according to the present invention, there is provided a vehicle-carried navigation system which comprises a sensor means for detecting a condition of movement of a vehicle in which the vehicle-carried navigation system is incorporated, map data storage means in which information for the detection of a current position of the vehicle and information for the drawing of a map are stored, current position detecting means for detecting a current position of the vehicle from a condition of movement of the vehicle received from the sensor means and map data received from the map data storage means, picture drawing means for drawing a map in accordance with map data received from the map data storage means and for determining a position of a current position of the vehicle received from the current position detecting means with respect to the thus drawn map, each of the current position detecting means and the picture drawing means having memory means for storing therein map data received from the map data storage means, a display unit for displaying thereon a map and a current position of the vehicle in accordance with information of a map and a position of the vehicle received from the picture drawing means, judging means for receiving a request for map data from the current position detecting means or the picture drawing means and judging, when a request for map data is received from one of the current position detecting means and the picture drawing means, whether or not such map data are already held in the other of the current position detecting means and the picture drawing means, and map data transfer means responsive to a result of the judgment of the judging means for reading out map data from the map data storage means when judgment of the judging means is negative and transferring, when the judgment of the judging means is affirmative, map data from that one of the current position detecting means and the picture drawing means which has such map data held therein to the other of the current position detecting means and the picture drawing means.

With the vehicle-carried navigation system, when the current position detecting means tries to read out map data from the map data storage means, the judging means judges whether or not such map data have been read into and are held in the picture drawing means, and if such map data are already held in the picture drawing means, the map data are not read out from the map data storage means but are transferred from the picture drawing means to the current position detecting means by the map data transfer means.

On the other hand, when the picture drawing means tries to read out map data from the map data storage means, the judging means judges whether or not such map data have been read into and are held in the current position detecting means, and if such map data are already held in the map data detecting means, the map data are transferred from the current position detecting means to the picture drawing means by the map data transfer means.

Thus, with the vehicle-carried navigation system, even if setting or extensive correction of a current position is executed, judgment of a current position is not delayed due to the provision of the judging means for judging whether or not map data requested by one of the current position detecting means and the picture drawing means are already held in the other of them and the map data transfer means for transferring map data from that one of the current position detecting means and the picture drawing means which has such map data held therein to the other of them.

Further, even when the vehicle moves at a high speed in a current position displaying mode, a displayed map is updated without delay, and also when the display mode is changed over from a map displaying mode to a current position displaying mode, a map around a current position of the vehicle is displayed rapidly.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 4 is a block diagram of a modification to the vehicle-carried navigation system shown in FIG. 1: and FIG. 5 is a block diagram of an exemplary one of conventional vehicle-carried navigation systems.

DESCRIPTION OF THE PREFERRED EMBODIMENT

Figure 1:
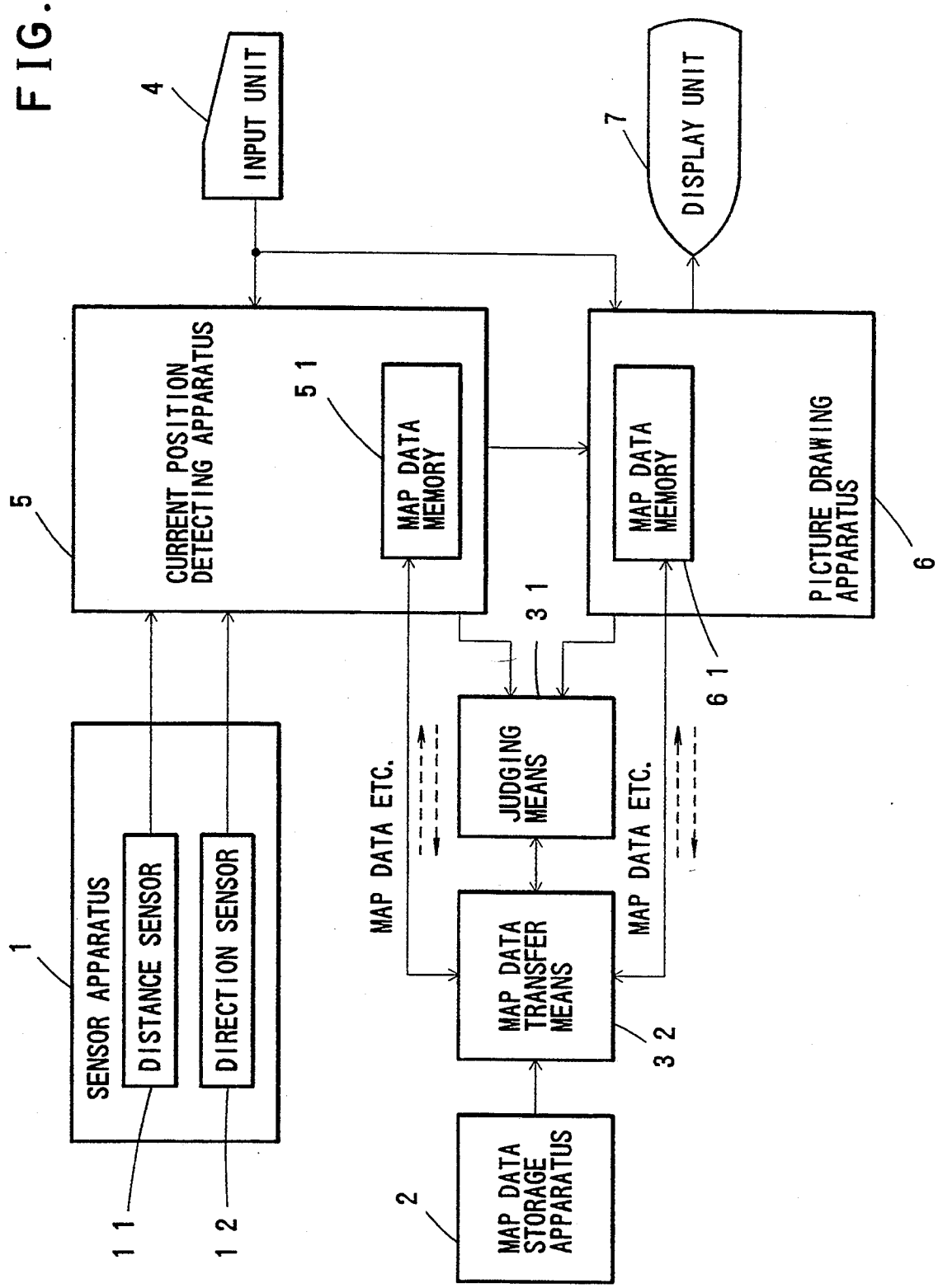
FIG. 1 is a block diagram of a vehicle-carried navigation system showing a preferred embodiment of the present invention.

FIG. 1, illustrates a vehicle-carried navigation system in a preferred embodiment of the present application.

The vehicle-carried navigation system shown has some common components as the conventional vehicle-carried navigation system described hereinabove with reference to FIG. 5, and like elements thereof are denoted by like reference numerals to those of the vehicle-carried navigation system of FIG. 5 and detailed description thereof are omitted herein to avoid redundancy.

The vehicle-carried navigation system shown in FIG. 1 is different from the conventional vehicle-carried navigation system shown in FIG. 5 in that it includes judging means 31 and map data transfer means 32 in place of the changing over means 3.

The judging means 31 judges, when the current position detecting apparatus 5 tries to read out map data from the map data storage apparatus 2, whether or not such map data have been read into and are held in the picture drawing apparatus 6, and judges, when the picture drawing apparatus 6 tries to read out map data from the map data storage apparatus 2, whether or not such map data has been read into and are held in the current position detecting means 5, and then outputs a result of such judgment.

The map data transfer means 32 is connected to the map data storage means 2 and also to the current position detecting apparatus 5, picture drawing apparatus 6 and judging means 31 and has a function of changing over, when map data are to be read out from the map data storage means 2, the destination of such map data between the current position detecting apparatus 5 and the picture drawing apparatus 6 and another function of transferring, in accordance with a result of judgment received from the judging means 31, map data held in one of the current position detecting apparatus 5 and the picture drawing apparatus 6 to the other apparatus 6 or 5.

In operation, the current position detecting apparatus 5 executes dead-reckoning navigation in accordance with a distance pulse signal from the distance sensor 11 and a direction signal from the direction sensor 12 representative of an advancing direction of the vehicle to calculate a new current position of the vehicle.

Simultaneously, the current position detecting apparatus 5 reads out map data from the map data storage apparatus 2 and stores the map data into the map data memory 51 thereof, and then executes, in accordance with road data in the map data, map matching for the current position of the vehicle calculated in accordance with the dead-reckoning navigation to judge a more precise current position of the vehicle. Then, the current position detecting apparatus 5 outputs current position information of a result of such judgment to the picture drawing apparatus 6.

While such operation of the current position detecting apparatus 5 as described just above is similar to the operation of the current position detecting apparatus 5 of the conventional vehicle-carried navigation system described hereinabove, the vehicle-carried navigation system of the present embodiment operates also in a different manner due to the presence of the judging means 31 and the map data transfer means 32. In particular, when the current position detecting apparatus 5 tries to store map data into the map data memory 51 thereof, the judging means 31 judges whether or not the map data requested by the current position detecting apparatus 5 have been read into and are held in the picture drawing apparatus 6, and if the map data are held in the map data memory 51, then the map data are transferred from the picture drawing apparatus 6 to the current position detecting apparatus 5. On the contrary, if the map data are not held in the map data memory 51, then the map data are read out from the map data storage apparatus 2 and stored into the map data memory 51.

Figure 2:
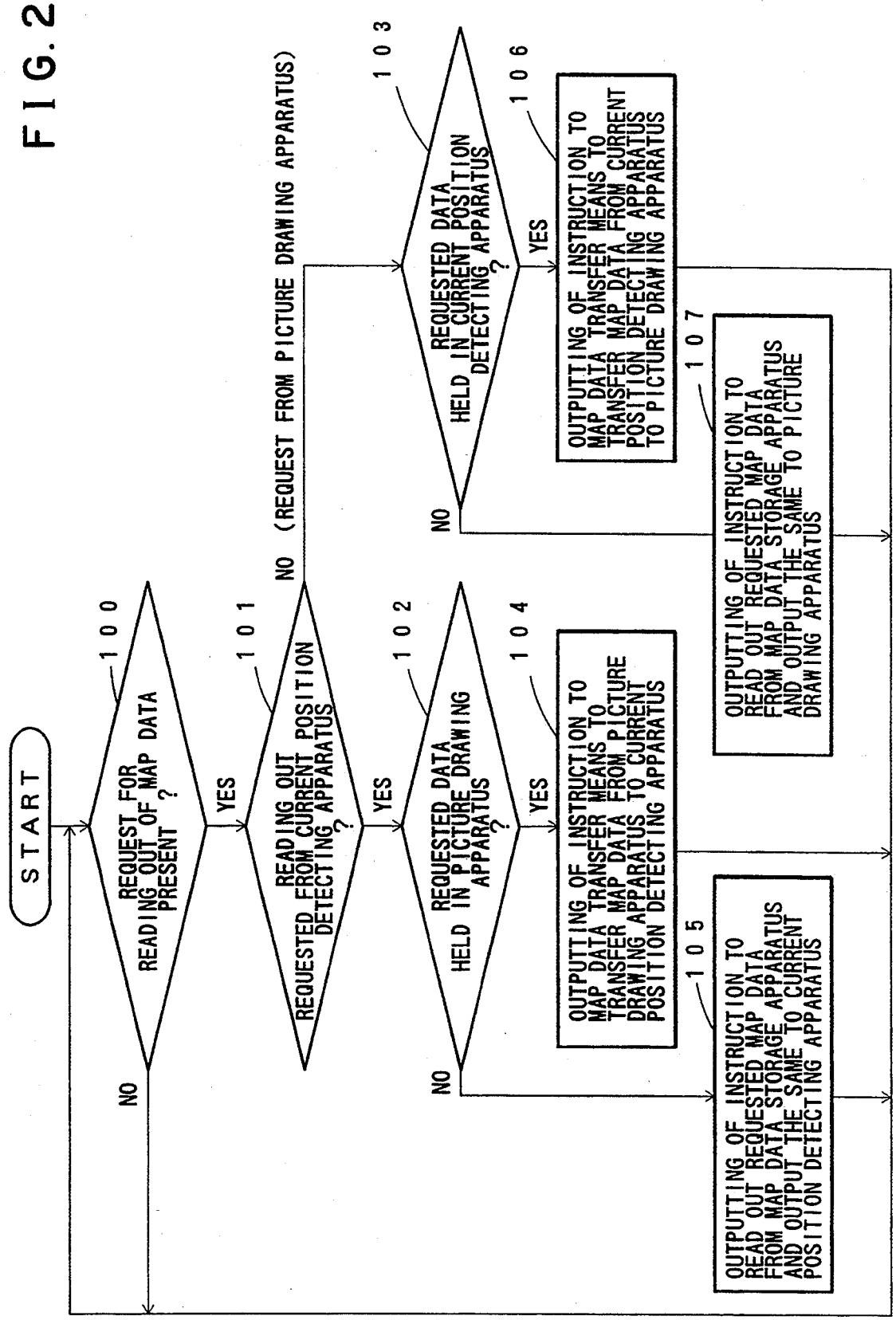
FIG. 2 is a flow chart illustrating operation of judging means of the vehicle-carried navigation system of FIG. 1.

A procedure of such judgment by the judging means 31 is illustrated in a flow chart of FIG. 2 which shows a judging program stored in a program memory (not shown) of a microcomputer (not shown) of the judging means 31.

Referring to FIG. 2, the judging means 31 first judges at step 100 whether or not there is a request for reading out of map data from the current position detecting apparatus 5 or the picture drawing apparatus 6. If presence of such request is judged, then the control sequence advances to step 101.

At step 101, the judging means 31 judges whether such request for reading out of map data has been delivered from the current position detecting apparatus 5 or the picture drawing apparatus If it has been judged that the reading out request for map data has been delivered from the current position detecting apparatus 5, the control sequence advances to step 102, but otherwise, the control sequence advances to step 103.

At step 102, it is judged whether or not the map data requested by the current position detecting apparatus 5 are already held in the map data memory of the picture drawing apparatus 6.

If it is judged that the map data are already held in the map data memory 61, the control sequence advances to step 104 at which the judging means 31 outputs an instruction to the map data transfer means 82 to transfer the map data from the map data memory the picture drawing apparatus 6 to the map data memory 51 of the current position detecting apparatus 5.

On the contrary, if it is judged at step 102 that the map data requested by the current position detecting apparatus are not held in the map data memory 61 of the picture drawing apparatus 6, then the control sequence advances from step 102 to step 105, at which the judging means 31 outputs an instruction to the map data transfer means 32 to read out the map data from the map data storage apparatus 2 and output the thus read map data to the current position detecting apparatus 5.

On the other hand, at step 103, it is judged whether or not the map data requested by the picture drawing apparatus are already held in the map data memory 51 of the current position detecting apparatus 5.

If it is judged that the map data are held in the map data memory 51, the control sequence advances to step 106 at which the judging means 31 outputs an instruction to the map data transfer means 32 to transfer the map data from the map data memory 51 of the current position detecting apparatus 5 to the map data memory 61 of the picture drawing apparatus 6.

On the contrary, if it is judged at step 103 that the map data requested by the picture drawing apparatus 6 are not yet held in the map data memory 51 of the current position detecting apparatus 5, then the control sequence advances from step 103 to step 107, at which the judging means 31 outputs an instruction to the map data transfer means 32 to read the map data from the map data storage apparatus 2 and output the thus read out map data to the picture drawing apparatus 6.

Figure 3:
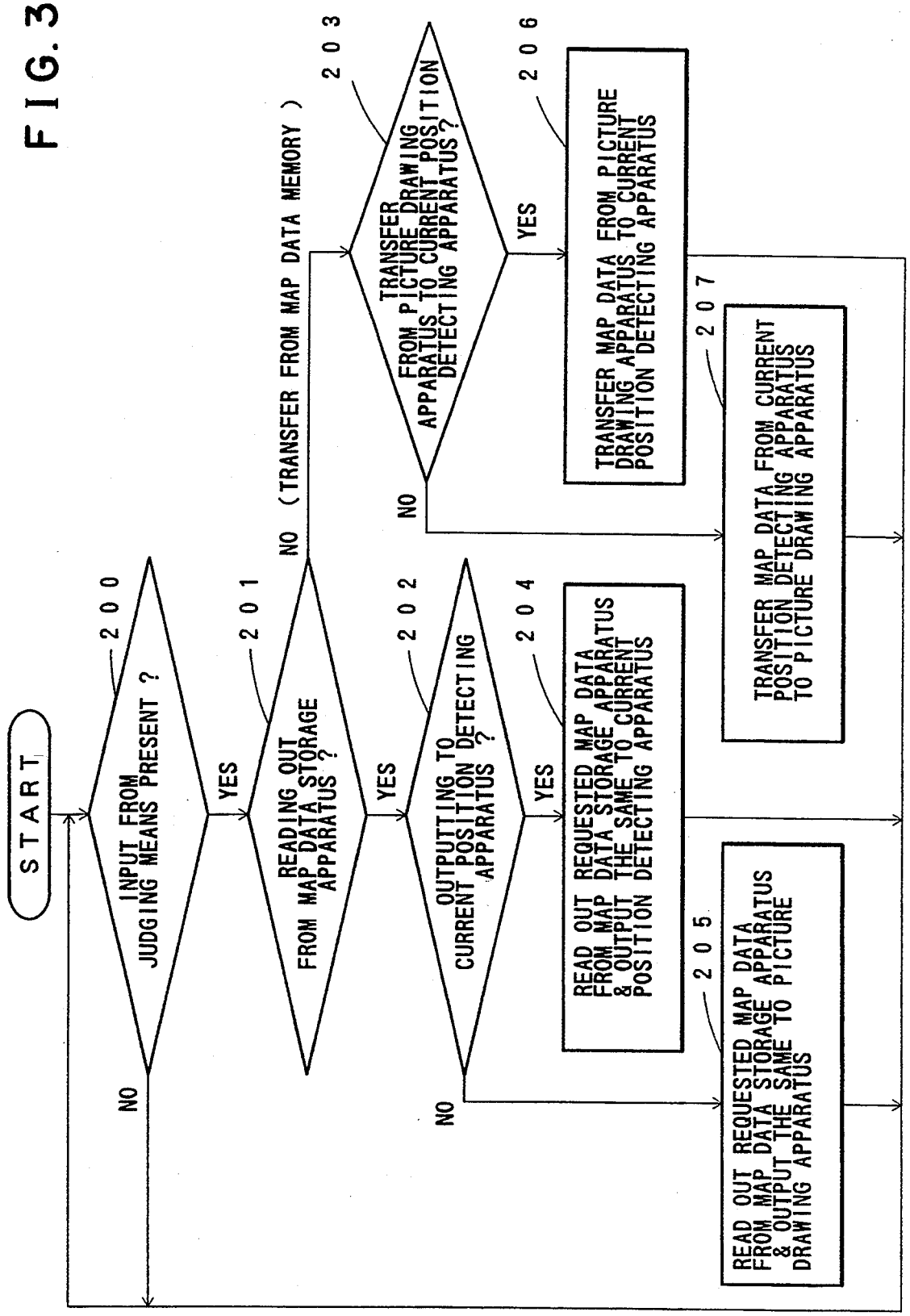
FIG. 3 is a flow chart illustrating operation of map data transfer means of the vehicle-carried navigation system of FIG. 1.

Subsequently, operation of transfer processing of the map data transfer means 32 will be described with reference to FIG. 3 which illustrates a map data reading out and transfer program stored in a program memory (not shown) of a microcomputer (not shown) of the map data transfer means First at step 200, it is judged whether or not there is an input of an instruction from the judging means 31. If it is judged that such input is present, the control sequence advances from step 200 to step 201.

At step 201, it is judged whether OF not the instruction from the judging means 81 is an instruction to read out map data from the map data storage apparatus 2. If it is judged that the instruction is an instruction to read out map data from the map data storage apparatus 2, the control sequence advances to step 202, but otherwise, the control sequence advances to step 203.

At step 202, the map data transfer means judges, from the instruction received from the judging means 31, whether the destination of map data to be read out from the map data storage apparatus 2 is the current position detecting apparatus 5 or the picture drawing apparatus 6.

In case the destination is the current position detecting apparatus 5, the control sequence advances from step 202 to step 204, at which the requested map data are read out from the map data storage apparatus 2 and outputted to the current position detecting apparatus 5.

On the contrary, in case the destination is the picture drawing apparatus 6 at step 202, the control sequence advances from step 202 to step 205, at which the requested map data are read out from the map data storage apparatus 2 and outputted to the picture drawing apparatus 6.

On the other hand, at step 203, it is judged, from the instruction received from the judging means 31, whether the direction of transfer of map data is from the picture drawing apparatus 6 to the current position detecting apparatus 5 or reversely from the current position detecting apparatus 5 to the picture drawing apparatus 6.

If the direction of transfer of map data is from the picture drawing apparatus 6 to the current position detecting apparatus 5, the control sequence advances to step 206 at which the map data transfer means 32 transfers the requested map data from the map data memory 61 of the picture drawing apparatus 6 to the map data memory 51 of the current position detecting apparatus 5.

On the contrary, if it is judged at step 203 that the direction of transfer of map data is from the current position detecting apparatus 5 to the picture drawing apparatus 6, the control sequence advances from step 203 to step 207, at which the map data transfer means 32 transfers the requested map data from the map data memory 51 of the current position detecting apparatus 5 to the map data memory 61 of the picture drawing apparatus 6.

Referring back to FIG. 1, the picture drawing apparatus 6 receives, similarly as the picture drawing apparatus of the conventional vehicle-carried navigation system described hereinabove, map data of a map around a current position of the vehicle into the map data memory 61 thereof and draws a map in accordance with such map data.

Then, the picture drawing apparatus 6 generates a display controlling and displaying signal to display the current position on the map drawn thereby. However, when map data are to be received into the map data memory 61, it is judged by the judging means 31 and the map transfer means 32 whether the map data requested by the picture drawing apparatus 6 have been read into and are held in the current position detecting apparatus 5.

If it is judged that the requested map data are already held in the current position detecting apparatus 5, the map data are transferred from the current position detecting apparatus 5 to the picture drawing apparatus 6. But on the contrary if the requested map data are not held in the current position detecting apparatus 5, then the map data are read out from the map data storage apparatus 2 and inputted to the picture drawing apparatus 6.

As a result of such a sequence of operations as described above, the current position is displayed on the display unit 7 together with a map around the current position of the vehicle.

On the other hand, the current position detecting apparatus 5 also executes correction of the current position and initial setting in response to a switch signal from the input unit 4.

Similarly, the picture drawing apparatus 6 also executes, in response to a switch signal from the input unit 4, drawing of a map of a different display scale and changing over of the display mode between a current position displaying mode in which a current position is displayed and a map displaying mode in which a map of an arbitrary region is displayed.

It is to be noted that, while the vehicle-carried navigation system of the embodiment described above includes the map data transfer means 32 which transfers map data in opposite directions between the current position detecting apparatus 5 and the picture drawing apparatus 6, it may otherwise include modified data transfer means 33 which transfers map data only in one direction from the picture drawing apparatus 6 to the current position detecting apparatus 5 as seen from FIG. 4. Also when setting of or extensive modification to a current position is executed, judgment of a current position of the vehicle is not delayed at all.

Further, while the vehicle-carried navigation system of the embodiment described above includes the map data transfer means 32 which has a function of changing over the destination of map data read out from the map data storage apparatus 2, similar effects will be exhibited otherwise if means for changing over such destination of map data is provided separately from the map data transfer means 32.

Having now fully described the invention, it will be apparent to one of ordinary skill in the art that many changes and modifications can be made thereto without departing from the spirit and scope of the invention as set forth herein.

What is claimed is:

1. A vehicle-carried navigation system comprising:
   sensor means for detecting a movement of a vehicle in which said vehicle-carried navigation system is incorporated,
   map data storage means for storing a current position of said vehicle and map data,
   current position detecting means for detecting the current position of said vehicle from the movement of said vehicle received from said sensor means and the map data from said map data storage means,
   picture drawing means for drawing a map in accordance with the map data received from said map data storage means and for determining the current position of said vehicle received from said current position detecting means with respect to the drawn map, each of said current position detecting means and said picture drawing means including memory means for storing the map data received from said map data storage means, a display unit for displaying the map and the current position of said vehicle, judging means for receiving a request for the map data from said current position detecting means or said picture drawing means and judging, when a request for the map data is received from one of said current position detecting means and said picture drawing means, whether or not the map data is already stored in the memory means of the other of said current position detecting means and said picture drawing means, and map data transfer means, responsive to the judgment of said judging means, for reading the map data from said map data storage means when the map data is not already stored in memory means of the other of said current position detecting means and said picture drawing means and transferring the map data from the memory means of the other of said current position detecting means and said picture drawing means to the one of said current position detecting means and said picture drawing means, when the map data is already stored in the memory means of the other of said current position detecting means and said picture drawing means.

2. The vehicle-carried navigation system of claim 1, wherein said map data transfer means transfers the map data only from the memory means of said picture drawing means to said current position detecting means.

* * * * *